United States Patent
Kang et al.

(10) Patent No.: US 9,076,578 B2
(45) Date of Patent: Jul. 7, 2015

(54) DIELECTRIC COMPOSITION AND CERAMIC ELECTRONIC COMPONENT INCLUDING THE SAME

(71) Applicant: Samsung Electro-mechanics Co., Ltd., Gyunggi-do (KR)

(72) Inventors: Sung Hyung Kang, Gyunggi-do (KR); Du Won Choi, Gyunggi-do (KR); Min Sung Song, Gyunggi-do (KR); Sang Hoon Kwon, Gyunggi-do (KR); Chang Hoon Kim, Gyunggi-do (KR); Byoung Hwa Lee, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 102 days.

(21) Appl. No.: 13/660,527

(22) Filed: Oct. 25, 2012

(65) Prior Publication Data

US 2013/0119827 A1 May 16, 2013

(30) Foreign Application Priority Data

Nov. 11, 2011 (KR) .................. 10-2011-0117799

(51) Int. Cl.
*H01L 41/187* (2006.01)
*H01C 17/065* (2006.01)
(Continued)

(52) U.S. Cl.
CPC ..... *H01C 17/06533* (2013.01); *Y10T 428/2982* (2015.01); *H01B 3/12* (2013.01);
(Continued)

(58) Field of Classification Search
USPC .............. 310/358, 357, 363–365, 311; 252/62.9 PZ, 62.9 R; 501/134, 135, 501/137–138, 139
See application file for complete search history.

(56) References Cited

U.S. PATENT DOCUMENTS 7,031,748 B2 * 4/2006 Takagi .................. 455/553.1
7,042,707 B2 * 5/2006 Umeda et al. ............ 501/138
(Continued)

FOREIGN PATENT DOCUMENTS

CN  1765824    *  5/2006   ........... C04B 35/468
CN  1765824  A    5/2006
(Continued)

OTHER PUBLICATIONS

Chinese Office Action issued in Chinese Application No. 201210399269.2 dated Mar. 18, 2014, w/english translation.
(Continued)

*Primary Examiner* — Thomas Dougherty
*Assistant Examiner* — Karen B Addison
(74) *Attorney, Agent, or Firm* — McDermott Will & Emery LLP

(57) ABSTRACT

There is provided a dielectric composition, including; a base powder including $Ba_mTiO_3$ ($0.995 \leq m \leq 1.010$); a first sub-component including 0.05 to 4.00 moles of an oxide or carbonate containing at least one rare-earth element based on 100 moles of the base powder; a second sub-component including 0.05 to 0.70 moles of an oxide or carbonate containing at least one transition metal; a third sub-component including 0.20 to 2.00 moles of a Si oxide; a fourth sub-component including 0.02 to 1.00 mole of an Al oxide; and a fifth sub-component including 20 to 140% of an oxide containing at least one of Ba and Ca, based on the third sub-component.

15 Claims, 1 Drawing Sheet

(51) Int. Cl.
*H01B 3/12* (2006.01)
*H01G 4/30* (2006.01)
*H01C 7/00* (2006.01)
*H01G 4/12* (2006.01)
*C04B 35/468* (2006.01)
*H01C 7/02* (2006.01)
*H01C 7/04* (2006.01)

(52) U.S. Cl.
CPC ............... *H01G 4/30* (2013.01); *H01C 7/003* (2013.01); *H01C 7/025* (2013.01); *H01C 7/045* (2013.01); *H01G 4/1227* (2013.01); *C04B 35/4682* (2013.01); *C04B 2235/3208* (2013.01); *C04B 2235/3215* (2013.01); *C04B 2235/3217* (2013.01); *C04B 2235/3224* (2013.01); *C04B 2235/3239* (2013.01); *C04B 2235/3244* (2013.01); *C04B 2235/3256* (2013.01); *C04B 2235/3258* (2013.01); *C04B 2235/3262* (2013.01); *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/36* (2013.01); *C04B 2235/442* (2013.01); *C04B 2235/5409* (2013.01); *C04B 2235/785* (2013.01); *C04B 2235/79* (2013.01)

(56) References Cited

U.S. PATENT DOCUMENTS

| | | | |
|---|---|---|---|
| 7,790,645 B2 | 9/2010 | Seki et al. | |
| 7,796,373 B2 * | 9/2010 | Sasabayashi et al. | 501/139 |
| 8,088,703 B2 * | 1/2012 | Kang et al. | 501/139 |
| 8,593,038 B2 * | 11/2013 | Kang et al. | 310/358 |
| 2006/0046922 A1 | 3/2006 | Ito et al. | |
| 2006/0223692 A1 | 10/2006 | Ito et al. | |
| 2008/0115876 A1 | 5/2008 | Komatsu et al. | |
| 2011/0110018 A1 | 5/2011 | Ishii et al. | |
| 2011/0195835 A1 | 8/2011 | Kojima et al. | |
| 2012/0015198 A1 | 1/2012 | Masukawa et al. | |

FOREIGN PATENT DOCUMENTS

| | | |
|---|---|---|
| CN | 1903788 A | 1/2007 |
| CN | 102060521 A | 5/2011 |
| CN | 102190492 A | 9/2011 |
| JP | 2000026161 A | 1/2000 |
| JP | 2001089231 A | 4/2001 |
| JP | 2005162505 A | 6/2005 |
| JP | 2008087976 A | 4/2008 |
| JP | 2008156182 A | 7/2008 |
| JP | 2008162818 A | 7/2008 |
| JP | 2008-230928 A | 10/2008 |
| KR | 10-2006-0050802 A | 5/2006 |
| WO | 2006104026 A1 | 10/2006 |
| WO | 2010110201 A1 | 9/2010 |

OTHER PUBLICATIONS

Japanese Office Action issued in Japanese Application No. 2012-225722 dated Feb. 4, 2014, w/English translation.
Korean Office Action issued in Korean Application No. 10-2011-0117799 dated Oct. 29, 2014, with English Translation.
Japanese Patent Office Action dated Jan. 6, 2015 issued in corresponding Japanese Patent Application No. 2012-225722 (English translation).
Korean Office Action issued in Korean Application No. 10-2011-0117799 dated Apr. 27, 2015, with English Translation.

* cited by examiner

A-A'

DIELECTRIC COMPOSITION AND CERAMIC ELECTRONIC COMPONENT INCLUDING THE SAME

CROSS-REFERENCE TO RELATED APPLICATIONS

This application claims the priority of Korean Patent Application No. 10-2011-0117799 filed on Nov. 11, 2011, in the Korean Intellectual Property Office, the disclosure of which is incorporated herein by reference.

BACKGROUND OF THE INVENTION

1. Field of the Invention

The present invention relates to a dielectric composition and a ceramic electronic component including the same.

2. Description of the Related Art

Electronic components using ceramic materials include capacitors, inductors, piezoelectric elements, varistors, thermistors, and the like.

Among such ceramic electronic components, a multilayer ceramic capacitor (MLCC) generally has the advantageous features of a compact size with a high capacity and ease of mounting.

The MLCC is a chip-type capacitor typically mounted on a printed circuit board provided in various electronic devices including display units such as liquid crystal displays (LCDs), plasma display panels (PDPs) and the like, computers, personal digital assistants (PDAs), cellular phones, and the like, and has an important role in being charged with, as well as discharging, electricity.

Recently, as display units such as LCDs, PDPs, and the like have been enlarged and computer CPU speeds ('clock rates') have been increased, an electronic apparatus may generate significant amounts of heat. Therefore, in order to enable integrated circuits (ICs) to operate stably, it is necessary to guarantee stable capacitance and reliability even at high temperatures.

Additionally, the MLCC may have a size within a wide range and various forms of lamination based on use and capacity thereof.

Specifically, in response to the recent trend towards the manufacturing of compact, light-weight and multi-functional electronic apparatuses, MLCCs used for such electronic apparatuses have also been required to have a very compact size, ultra-high capacity and elevated voltages.

Accordingly, in order to manufacture an extremely compact product, an MLCC in which a thickness of each dielectric layer and internal electrode is decreased, while the number of laminated internal electrode layers is increased to impart ultra-high capacity, is currently being manufactured.

However, in the case in which voltages are elevated along with a decrease in the thickness of the dielectric layers in the process of manufacturing MLCCs, there may be degradation in internal voltage and/or DC-bias features such as BDV, high temperature IR, and the like, due to an increase in electric field intensity applied to the dielectric layers and defects in a microfine structure, thus causing problems.

In order to prevent the above-mentioned problems, it may be necessary to prepare a base powder in microfine particle form. However, when an average particle size of the base powder is decreased, it may be difficult to realize or embody desired capacitance and temperature characteristics suitable for a user's requirements while dielectric effects (commonly referred to as 'permittivity') are reduced.

SUMMARY OF THE INVENTION

In the related art in the technical field to which the present invention pertains, a novel idea for the development of a dielectric layer having the same capacity as those known in the related art, without a decrease in a thickness thereof, so as to guarantee reliability, has been demanded.

According to an aspect of the present invention, there is provided a dielectric composition, including: a base powder including $Ba_mTiO_3$ ($0.995 \le m \le 1.010$); a first sub-component including 0.05 to 4.00 moles of an oxide or carbonate containing at least one rare-earth element based on 100 moles of the base powder; a second sub-component including 0.05 to 0.70 moles of an oxide or carbonate containing at least one transition metal based on 100 moles of the base powder; a third sub-component including 0.20 to 2.00 moles of a Si oxide based on 100 moles of the base powder; a fourth sub-component including 0.02 to 1.00 mole of an Al oxide based on 100 moles of the base powder; and a fifth sub-component including 20 to 140% of an oxide containing at least one of Ba and Ca, based on the third sub-component.

The dielectric composition may have an average grain size of 0.75 μm or less.

The dielectric composition may further include 0.01 to 2.50 moles of an Mg oxide or carbonate, based on 100 moles of the base powder.

The dielectric composition may further include 0.01 to 1.00 mole of a Zr oxide, based on 100 moles of the base powder.

The rare-earth element of the first sub-component may be at least one selected from the group consisting of Y, Dy, Ho, Er and Gd.

The transition metal of the second sub-component may be at least one selected from the group consisting of Mo, W, Mn, Fe, Co, Ni, V, Cr, Cu and Zn.

According to another aspect of the present invention, there is provided a ceramic electronic component, including: a ceramic body having a plurality of dielectric layers laminated therein; internal electrodes provided within the ceramic body and including a base metal; and external electrodes provided on an outer surface of the ceramic body and electrically connected to the internal electrodes, wherein the dielectric layers may include: a base powder including $Ba_mTiO_3$ ($0.995 \le m \le 1.010$); a first sub-component including 0.05 to 4.00 moles of an oxide or carbonate containing at least one rare-earth element based on 100 moles of the base powder; a second sub-component including 0.05 to 0.70 moles of an oxide or carbonate containing at least one transition metal based on 100 moles of the base powder; a third sub-component including 0.20 to 2.00 moles of a Si oxide based on 100 moles of the base powder; a fourth sub-component including 0.02 to 1.00 mole of an Al oxide based on 100 moles of the base powder; and a fifth sub-component including 20 to 140% of an oxide containing at least one of Ba and Ca, based on the third sub-component.

Each of the dielectric layers may have a thickness in a range of 0.2 to 10 μm.

The internal electrodes may include Ni or a Ni alloy.

The internal electrodes may be alternately laminated with the dielectric layers.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
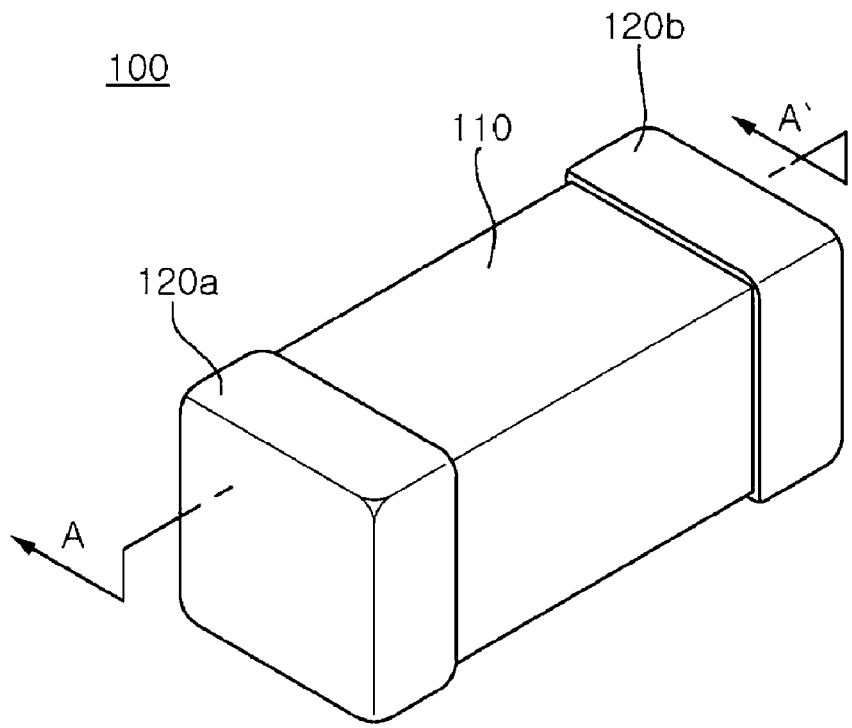
FIG. 1 is a schematic perspective view illustrating a multilayer ceramic capacitor ('MLCC') according to an embodiment of the present invention.

Embodiments of the present invention will now be described in detail with reference to the accompanying drawings.

The embodiments of the present invention may be modified in many different forms and the scope of the invention should not be limited to the embodiments set forth herein.

Rather, these embodiments are provided so that this disclosure will be thorough and complete, and will fully convey the concept of the invention to those skilled in the art.

In the drawings, the shapes and dimensions of components maybe exaggerated for clarity, and the same reference numerals will be used throughout to designate the same or like components.

In addition, unless explicitly described to the contrary, the word "containing" and "including" will be understood to imply the inclusion of stated components but not the exclusion of any other components.

The present invention relates to a dielectric composition, and a ceramic electronic component including the dielectric composition according to embodiments of the present invention may include, for example, a multilayer ceramic capacitor, an inductor, a piezoelectric element, a varistor, a chip-resistor, a thermistor or the like. Hereinafter, a multilayer ceramic capacitor (hereinafter, also referred to as 'MLCC') will be described as an example of the ceramic electronic component.

Figure 2:
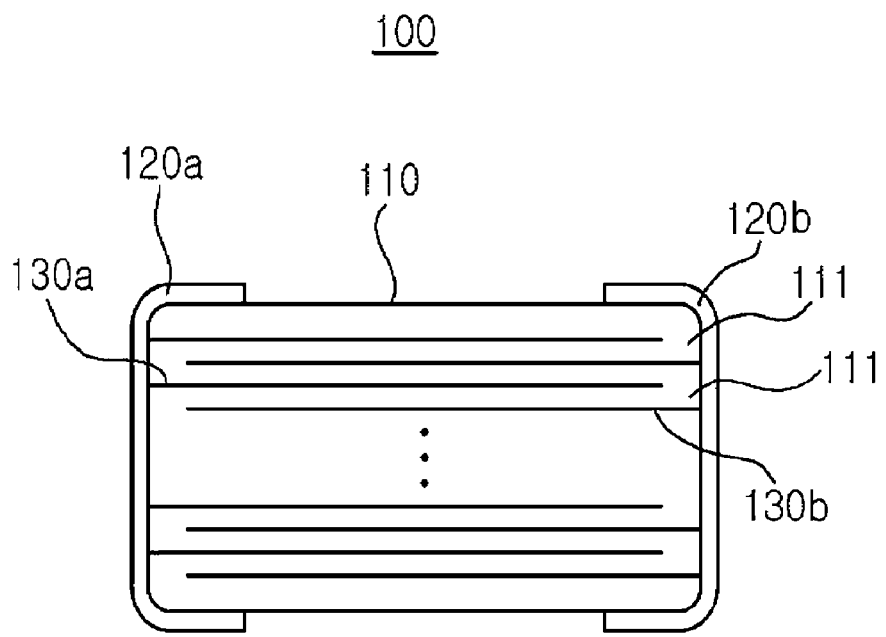
FIG. 2 is a cross-sectional view taken along line A-A' in FIG. 1.

Referring to FIGS. 1 and 2, a multilayer ceramic capacitor 100 according to an embodiment of the present invention has a ceramic body 110 including a dielectric layer 111, first and second internal electrodes 130a and 130b alternately laminated with the dielectric layer 111 interposed therebetween.

First and second external electrodes 120a and 120b are provided on both ends of the ceramic body 110 and electrically connected to the alternately laminated first and second internal electrodes 130a and 130b, respectively.

The ceramic body 110 may have a rectangular shape, but is not particularly limited thereto.

Also, a dimension of the ceramic body 110 is not particularly limited. For example, the ceramic body may have a size of (0.6 to 5.6 mm)×(0.3 to 5.0 mm)×(0.3 to 1.9 mm).

A thickness of the dielectric layer 111 may be changed according to desired capacitance of a capacitor. For instance, when the extremely thin dielectric layer 111 is provided as a single layer, the amount of crystalline particles therein may be very low, thereby affecting reliability thereof.

Accordingly, after firing, the thickness of each dielectric layer 111 may be set to 0.2 μm or more, preferably, to a range of 0.2 to 10.0 μm. However, the present invention is not limited thereto.

The first and second internal electrodes 130a and 130b may be laminated such that respective ends thereof are alternately exposed to both ends of the ceramic body 110.

A conductive material contained in the first and second internal electrodes 130a and 130b is not particularly limited, however, may include a base metal since the material of the dielectric layer 111 should be non-reducible.

The base metal may include Ni or a Ni alloy. The Ni alloy may include Ni and at least one selected from Mn, Cr, Co and Al.

A capacitor circuit may be formed such that the first and second external electrodes 120a and 120b may be formed on both ends of the ceramic body 110 and electrically connected to the exposed ends of the alternately laminated first and second internal electrodes 130a and 130b.

The conductive material contained in the first and second external electrodes 120a and 120b is not particularly limited, however, it may include Ni, Cu or alloys thereof.

The dielectric layers 111 forming the ceramic body 110 may contain a non-reducible dielectric composition.

The non-reducible dielectric composition according to the present embodiment may include a base powder including $Ba_mTiO_3$ ($0.995 \le m \le 1.010$); a first sub-component including 0.05 to 4.00 moles of an oxide or carbonate containing at least one rare-earth element based on 100 moles of the base powder; a second sub-component including 0.05 to 0.70 moles of an oxide or carbonate containing at least one transition metal based on 100 moles of the base powder; a third sub-component including 0.20 to 2.00 moles of a Si oxide based on 100 moles of the base powder; a fourth sub-component including 0.02 to 1.00 mole of an Al oxide based on 100 moles of the base powder; and a fifth sub-component including 20 to 140% of an oxide containing at least one of Ba and Ca, based on the third sub-component.

Herein, a content of each sub-component may be based on atomic moles of sub-components illustrated below.

The atomic mole may refer to mole % of each element even in the case that the element is introduced in any of an oxide state or ionic state. For example, in the case in which a Y oxide is $Y_2O_3$, its content may be calculated on the basis of the content of $Y^{+3}$ in moles.

Meanwhile, when individual sub-components are mixed with a major component, a specific surface area of each sub-component may be 0.5 $m^2/g$ or greater; however, the present invention is not limited thereto.

In addition, a microfine structure of a fired material with the foregoing composition may have an average grain size of 0.75 μm or less; however, the present invention is not limited thereto.

The dielectric composition may assure a high dielectric constant of 1600 or more while retaining high temperature voltage resistance, that is, a high temperature accelerated lifespan substantially equal to that of an existing dielectric composition.

In addition, since the dielectric composition can be fired under a reduction atmosphere of 1250° C. or less ($10^{-12}$ or more, in terms of oxygen partial pressure), an internal electrode containing Ni or a Ni alloy may be used.

Accordingly, the foregoing composition may be effectively employed for development of ultra-high capacity MLCCs having relatively thin dielectric layers.

Hereinafter, individual components of a dielectric composition according to an embodiment of the present invention will be described in detail.

(a) Base Powder

A base powder, a major component of a dielectric material, may be a $Ba_mTiO_3$ ($0.995 \le m \le 1.010$) dielectric powder.

In this case, when m is less than 0.995, the base powder may be easily deoxidized (reduced) into a semi-conductive substance during firing under a reduction atmosphere. On the other hand, when m exceeds 1.010, a firing temperature may be excessively high.

(b) First Sub-Component

The first sub-component may include an oxide or carbonate containing at least one rare-earth element.

The rare-earth element increases reliability of the material. The rare-earth element may be at least one element selected from Y, Dy, Ho, Er and Gd. However, the rare-earth element used in the embodiment of the present invention is not limited thereto.

The oxide or carbonate containing the rare-earth element is not particularly limited in terms of a type thereof, and $Dy_2O_3$, $Y_2O_3$, $Ho_2O_3$, or the like may be used therefor.

In this regard, a content of the first sub-component allowing for appropriate reduction resistance and reliability may range from 0.05 to 4.00 moles based on 100 moles of the base powder.

When the content of the first sub-component is less than 0.05 moles, a firing temperature may be increased and reliability may be deteriorated.

On the contrary, when the content of the first sub-component exceeds 4.00 moles, a sintering temperature is raised, thereby causing difficulty in achieving a desired dielectric constant.

(c) Second Sub-Component

The second sub-component may include an oxide or carbonate containing transition metals.

The transition metal oxide or carbonate may allow for the reduction resistance and reliability of the dielectric composition.

Such transition metal may be a variable-valence acceptor and be selected from the group consisting of Mo, W, Mn, Fe, Co, Ni, V, Cr, Cu and Zn.

In this regard, the transition metal oxide or carbonate is not particularly limited in terms of a type thereof and $MnO_2$, $V_2O_5$, $MnCO_3$ or the like may be used therefor.

A content of the second sub-component allowing for appropriate reduction resistance and reliability may range from 0.05 to 0.70 moles based on 100 moles of the base powder.

When the content of the second sub-component is less than 0.05 moles, a high temperature accelerated lifespan may be decreased and a temperature coefficient of capacitance (TCC) may be unstable.

In addition, when the content of the second sub-component exceeds 0.70 moles, a sintering temperature is decreased, but permittivity may also be reduced, and thus a desired dielectric constant may not be obtained and ageing properties may also be deteriorated.

(d) Third Sub-Component

The third sub-component serves to decrease a firing temperature and promote sintering. The third sub-component may include a Si oxide or glass containing a Si element.

Here, a content of the third sub-component may range from 0.20 to 2.00 moles based on 100 moles of the base powder.

When the content of the third sub-component is less than 0.20 moles, high permittivity may be obtained, but a firing temperature is increased to thereby deteriorate sintering properties.

When the content of the third sub-component exceeds 2.00 moles, it is difficult to control particle growth. In addition, sintering properties may be deteriorated and a desired dielectric constant may not be obtained.

(e) Fourth Sub-Component

The fourth sub-component may facilitate a decrease in a firing temperature and promote sintering. The fourth sub-component may include an Al oxide.

Here, a content of the fourth sub-component may range 0.02 to 1.00 mole based on 100 moles of the base powder.

When the content of the fourth sub-component is less than 0.02 moles, it is difficult to perform firing at a desired low firing temperature, causing a problem in that firing is performed at a relatively high temperature.

In addition, when the content of the fourth sub-component exceeds 1.00 mole, it is difficult to control particle growth. In addition, sintering properties may be deteriorated, and a desired dielectric constant may not be obtained.

(f) Fifth Sub-Component

The fifth sub-component serves to decrease a firing temperature while promoting sintering. The fifth sub-component may include an oxide containing at least one of Ba and Ca.

Here, a content of the fifth sub-component may range from 20 to 140% based on the content of the third sub-component.

When the content of the fifth sub-component is less than 20% based on the content of the third sub-component, permittivity is improved. However, reliability is deteriorated, a firing window (a firing temperature range within which excellent characteristics may be imparted) is narrowed, and TCC properties may be unstable.

On the other hand, when the content of the fifth sub-component exceeds 140% based on the content of the third sub-component, the firing window is enlarged. However, a firing density may be decreased and a firing temperature may be raised.

(g) Sixth Sub-Component

The sixth sub-component is not necessarily required for the dielectric composition according to the embodiment of the present invention, but may be optionally included therein as needed.

The sixth sub-component may include a Mg oxide or carbonate.

Here, a type of the Mg oxide or carbonate is not particularly limited, and MgO, $MgCO_3$, or the like may be used therefor.

The Mg oxide or carbonate may allow for an enlarged firing window and a decrease in a firing temperature.

A content of the Mg oxide or carbonate allowing for the foregoing effects may range from 0.01 to 2.50 moles based on 100 moles of the base powder. In the case of departing from the foregoing range, permittivity may be reduced.

Alternatively, besides the Mg oxide or carbonate, the sixth sub-component may further include a Zr oxide.

When the Zr oxide is added within a suitable range, permittivity may be further enhanced. A content of the Zr oxide may range from 0.01 to 1.00 mole based on 100 moles of the base powder.

Hereinafter, embodiments of the present invention will be described with reference to the following inventive and comparative examples. However, these embodiments are provided to convey the scope of the invention to those skilled in the art without being limited to the embodiments set forth herein.

Inventive Example

According to compositions and contents illustrated in Table 1, a raw material powder was prepared by including a base powder, first to fifth sub-components and optionally including a sixth sub-component. The raw material powder was mixed with ethanol, toluene, a dispersant and a binder and the mixture is subjected to ball milling for about 20 hours to thereby produce a slurry. Here, zirconia balls were used as a mix/dispersion medium.

The slurry was formed as ceramic sheets having a thickness of 2.0 μm and a thickness of 10 to 13 μm by a small doctor blade type coater.

Then, a Ni internal electrode was printed on the ceramic sheets.

Here, top and bottom covers were prepared by laminating 25 cover sheets, each of which has a thickness of 10 to 13 μm, and 20 Ni-printed active sheets were laminated while being compressed, thereby forming a compressed bar.

The compressed bar was cut into chips using a cutter, and each chip has a size of 3.2 mm×1.6 mm.

The cut chip was subjected to plasticizing to remove a binder fraction and firing at a temperature of 1100 to 1300° C. under a reduction atmosphere for about 2 hours, followed by a heat treatment for re-oxidation at about 1000° C. for about 3 hours.

Thereafter, the fired chip underwent a termination process and was left for about 24 hours, thereby fabricating a MLCC chip of 3.2 mm×1.6 mm, including 20 dielectric layers, each having a thickness of about 4.0 μm.

Assessment

The fabricated MLCC chip was subjected to measurement of room temperature capacitance and dielectric losses using an LCR meter under conditions of 1 kHz and 1V. More particularly, 10 samples were selected and DC 50V was applied to the selected samples in insulated state at room temperature for 60 seconds, and then the foregoing measurement was implemented. Here, the dielectric constant showed a numerical value rounded off to the nearest hundred.

A temperature coefficient of capacitance (TCC) depending upon temperature was measured at 85° C. and 125° C., respectively.

Meanwhile, a high temperature IR booster pressure test was performed to determine resistance degradation behavior under conditions of 150° C. and 1 Vr=10 V/μm, while stepwise increasing voltage by DC 10 V/μm, wherein each step of voltage application required 10 minutes and the resistance was measured at 5 second intervals.

From the results of the high temperature IR booster pressure test described above, high temperature withstand voltage, i.e., a high temperature accelerated lifespan has been induced. High temperature accelerated lifespan refers to a withstand voltage test, specifically, when DC voltage is applied to the fired MLCC chip having the 20 dielectric layers, each of which having a thickness of about 4.0 μm, at 150° C. while stepwise increasing voltage by DC 10 V/μm for 10 minutes, IR withstands $10^5 \Omega$ or more.

The following Table 1 shows the characteristics of dielectric materials having different compositions and the characteristics of X5R or X7R prototype chips formed of these dielectric materials.

TABLE 1

| No. | Grain size | 1st SC | 2nd SC | 3rd SC | 4th SC | Additional component | 3rd SC 5th SC | DC | 85° C. TCC (%) | 125° C. TCC (%) | HTAL | ST (° C.) | Note |
|---|---|---|---|---|---|---|---|---|---|---|---|---|---|
| Spec. Mini | | 0.05 | 0.05 | 0.2 | 0.02 | Mg, Zr | 20% | 1600 | −15 | −15 | 3 Vr | 1250 | |
| Max | | 4.00 | 0.7 | 2.0 | 1.0 | | 140% | 2800 | +15 | +15 | | 1240 | |
| 1 | 530 nm | — | Mn 0.1 | Si 0.6 | Al 0.03 | — | Ba 30% | 2800 | −10 | −19 | 0 Vr | 1240 | Com. Ex. |
| 2 | 410 nm | Y 4.5 | Mn 0.1; V 0.1 | Si 2.0 | — | Mg 0.8 | Ba 110% | 1500 | −5 | −9 | 3 Vr | 1290 | Com. Ex. |
| 3 | 350 nm | Y 1.0 | — | Si 0.9 | Al 0.1 | — | Ba 70%, Ca 20% | 3800 | −12 | −25 | 1 Vr | 1230 | Com. Ex. |
| 4 | 370 nm | Dy 2.2 | Mn 0.4, Cr 0.4 | Si 1.9 | Al 1.0 | — | Ba 120% | 1300 | −5 | −11 | 3 Vr | 1260 | Com. Ex. |
| 5 | 350 nm | Y 1.3, Mo 1.0 | Mn 0.1, V 0.1 | Si 1.8 | Al 0.03 | — | Ca 150% | 1900 | −5 | −10 | 2 Vr | 1270 | Com. Ex. |
| 6 | 300 nm | Y 0.7, Dy 0.7 | Cr 0.1, V 0.3 | Si 0.6 | Al 0.1 | | Ba 10% | — | — | — | 0 Vr | 1180 | Com. Ex. |
| 7 | 410 nm | Y 3.0 | Mn 0.1 V 0.1 | Si 0.3 | 0.02 | Mg 0.8 | Ba 90% | 2000 | −5 | −13 | 3 Vr | 1300 | Com. Ex. |
| 8 | 170 nm | Dy 0.5 | Mn 0.1 | Si 0.1 | Al 0.03 | — | Ba 80% | 2900 | −19 | −35 | 1 Vr | 1230 | Com. Ex. |
| 9 | 450 nm | Y 3.5 | Mn 0.05, Cr 0.1 | Si 1.9 | — | — | Ba 90% | 2500 | −7 | −13 | 2 Vr | 1290 | Com. Ex. |
| 10 | 170 nm | Dy 3.8 | Cr 0.15 | Si 1.95 | Al 2.0 | Mg 2.2 | Ba 85% | 1200 | −8 | −15 | 4 Vr | 1230 | Com. Ex. |
| 11 | 590 nm | Mo 0.1 | Mn 0.1 | Si 0.3 | Al 0.03 | — | Ba 20% | 3000 | −8 | −15 | 3 Vr | 1230 | Ex. |
| 12 | 320 nm | Y 1.0 | Mn 0.05 | Si 0.9 | Al 0.1 | — | Ba 70%, Ca 20% | 3500 | −14 | −25 | 4 Vr | 1220 | Ex. |
| 13 | 280 nm | Dy 3.9 | Mn 0.05, Cr 0.2 | Si 2.0 | Al 0.1 | Mg 0.6 | Ba 80% | 2200 | −3 | −10 | 5 Vr | 1240 | Ex. |
| 14 | 340 nm | Y 2.8, Mo 1.1 | Mn 0.3, V 0.3 | Si 1.95 | Al 0.3 | — | Ca 120% | 2000 | −2 | −8 | 3 Vr | 1250 | Ex. |
| 15 | 170 nm | Mo 0.8 | Mn 0.1, Cr 0.1, V 0.1 | Si 1.25 | Al 0.1 | — | Ba 80% | 2900 | −13 | −22 | 3 Vr | 1210 | Ex. |
| 16 | 180 nm | Y 1.0 | Mn 0.05, Cr 0.1 | Si 1.8 | Al 0.5 | Mg 0.2 | Ba 20% | 2800 | −11 | −20 | 4 Vr | 1190 | Ex. |
| 17 | 430 nm | Mo 2.2 | Cr 0.15 | Al 1.95 | Al 0.2 | Mg 2.5, Zr 0.15 | Ba 110% | 2600 | −12 | −18 | 4 Vr | 1250 | Ex. |
| 18 | 270 nm | Y 0.7, Dy 0.7 | Cr 0.1, V 0.3 | Si 1.2 | Al 0.1 | Mg 0.7 | Ba 110% | 1800 | −4 | −12 | 5 Vr | 1240 | Ex. |
| 19 | 290 nm | Mo 1.0 | Mn 0.1, Cr 0.1 | Si 0.85 | Al 1.0 | — | Ba 95% | 2800 | −13 | −17 | 4 Vr | 1210 | Ex. |
| 20 | 320 nm | Dy 0.09 | Cr 0.15, V 0.2 | Si 1.8 | | Zr 1.0 | Ba 140% | 3300 | −15 | −26 | 4 Vr | 1220 | Ex. |

* 1st SC: First Sub-Component, 2nd SC: second Sub-Component, 3rd SC: Third Sub-Component, 4th SC: fourth Sub-Component, 5th SC: Fifth Sub-Component, DC: Dielectric Constant, HTAL: High Temperature Accelerated Lifespan, ST: Sintering Temperature, Com. Ex.: Comparative Example, Ex.: Inventive Example
[Characteristics of dielectric compositions containing different components and proto-type chips fabricated using the same]

Referring to Comparative Example 1, it can be seen that a high temperature accelerated lifespan did not occur in the case that the first sub-component was not included.

Referring to Comparative Example 2, it can be seen that a dielectric constant was a very low value of 1500 and a sintering temperature was increased to 1290° C., in the case that 4.5 moles of yttrium (Y), the rare-earth element, was included as the first sub-component, based on 100 moles of the base powder.

Referring to Comparative Example 3, it can be seen that a high temperature accelerated lifespan was decreased to 1 Vr in the case that the second sub-component was not included.

Referring to Comparative Example 4, it can be seen that a dielectric constant was a low value of 1300 and a sintering temperature was increased to 1260° C. in the case that 0.4 moles of manganese (Mn) and 0.4 moles of chromium (Cr) were included as the second sub-components, based on 100 moles of the base powder.

Referring to Comparative Example 5, it can be seen that a high temperature accelerated lifespan was decreased to 2 Vr and a sintering temperature was increased to 1270° C. in the case that 150% of calcium (Ca) was included as the fifth sub-component, based on the content of the third sub-component.

Referring to Comparative Example 6, it can be seen that a high temperature accelerated lifespan did not occur in the case that 10% of barium (Ba) was included as the fifth sub-component, based on the content of the third sub-component.

Referring to Comparative Example 7, it can be seen that a sintering temperature was increased to 1300° C. in the case that 3.0 moles of silicon (Si) was included as the third sub-component, based on 100 moles of the base powder.

Referring to Comparative Example 8, it can be seen that TCC was −19% at 85° C. and −35% at 125° C. and a high temperature accelerated lifespan was decreased to 1 Vr in the case that 0.1 moles of silicon (Si) was included as the third sub-component, based on 100 moles of the base powder.

Referring to Comparative Example 9, it can be seen that a high temperature accelerated lifespan was decreased to 2 Vr and a sintering temperature was increased to 1290° C. in the case that the fourth sub-component was not included.

Referring to Comparative Example 10, it can be seen that a dielectric constant was a low value of 1200 in the case that 2.0 moles of aluminum (Al) was included as the fourth sub-component, based on 100 moles of the base powder.

On the other hand, according to embodiments of the present invention, in the case in which 0.05 to 4.00 moles of the first sub-component, 0.05 to 0.70 moles of the second sub-component, 0.20 to 2.00 moles of the third sub-component, and 0.02 to 1.00 mole of the fourth sub-component based on 100 moles of the base powder, in addition to 20 to 140% of the fifth sub-component based on the third sub-component, were included, a dielectric constant was a high value of 1600 or more, and TCC was −15% and +15% at 85° C. and 125° C., respectively.

Moreover, it was confirmed that a high temperature accelerated lifespan was 3 Vr or more, and a sintering temperature was not higher than 1250° C.

Consequently, in the case in which the dielectric composition satisfying the foregoing contents in the embodiment of the present invention is prepared, capacitance substantially equal to those of existing dielectric compositions may be obtained, even without a reduction in the thickness of the dielectric layer so as to secure reliability.

As set forth above, according to embodiments of the present invention, a dielectric composition allowing for the same level of capacitance as those of existing dielectric compositions, without a reduction in a thickness of a dielectric layer in order to secure reliability, as well as a ceramic electronic component including the same, may be provided.

While the present invention has been shown and described in connection with the embodiments, it will be apparent to those skilled in the art that modifications and variations can be made without departing from the spirit and scope of the invention as defined by the appended claims.

What is claimed is:

1. A dielectric composition for a dielectric constant of a ceramic body being at least 1600 or more comprising:
    a base powder including $Ba_mTiO_3$ ($0.995 \leq m \leq 1.010$);
    a first sub-component including 0.05 to 4 moles of an oxide or carbonate containing at least one rare-earth element based on 100 moles of the base powder;
    a second sub-component including 0.05 to 0.7 moles of an oxide or carbonate containing at least one transition metal based on 100 moles of the base powder;
    a third sub-component including 0.2 to less than 2 moles of a Si oxide based on 100 moles of the base powder;
    a fourth sub-component including 0.02 to 1 mole of an Al oxide based on 100 moles of the base powder; and
    a fifth sub-component including 20 to 140% of an oxide containing at least one of Ba and Ca, based on the third sub-component.

2. The dielectric composition of claim 1, wherein an average grain size is 0.75 μm or less.

3. The dielectric composition of claim 1, further comprising 0.01 to 2.5 moles of an Mg oxide or carbonate, based on 100 moles of the base powder.

4. The dielectric composition of claim 1, further comprising 0.01 to 1 mole of a Zr oxide, based on 100 moles of the base powder.

5. The dielectric composition of claim 1, wherein the rare-earth element of the first sub-component is at least one selected from the group consisting of Y, Dy, Ho, Er and Gd.

6. The dielectric composition of claim 1, wherein the transition metal of the second sub-component is at least one selected from the group consisting of Mo, W, Mn, Fe, Co, Ni, V, Cr, Cu and Zn.

7. A ceramic electronic component comprising:
    a ceramic body having a plurality of dielectric layers laminated therein;
    internal electrodes provided within the ceramic body and including a base metal; and
    external electrodes provided on an outer surface of the ceramic body and electrically connected to the internal electrodes,
    wherein the dielectric layers include: a base powder including $Ba_mTiO_3$ ($0.995 \leq m \leq 1.010$); a first sub-component including 0.05 to 4 moles of an oxide or carbonate containing at least one rare-earth element based on 100 moles of the base powder; a second sub-component including 0.05 to 0.7 moles of an oxide or carbonate containing at least one transition metal based on 100 moles of the base powder; a third sub-component including 0.2 to less than 2 moles of a Si oxide based on 100 moles of the base powder; a fourth sub-component including 0.02 to 1 mole of an Al oxide based on 100 moles of the base powder; and a fifth sub-component including 20 to 140% of an oxide containing at least one of Ba and Ca, based on the third sub-component, wherein
    a dielectric constant of the ceramic body is at least 1600 or more.

8. The ceramic electronic component of claim 7, wherein the dielectric composition has an average grain size of 0.75 μm or less.

9. The ceramic electronic component of claim 7, wherein the dielectric composition further includes 0.01 to 2.5 moles of an Mg oxide or carbonate, based on 100 moles of the base powder.

10. The ceramic electronic component of claim 7, wherein the dielectric composition further includes 0.01 to 1 mole of a Zr oxide, based on 100 moles of the base powder.

11. The ceramic electronic component of claim 7, wherein the rare-earth element of the first sub-component is at least one selected from the group consisting of Y, Dy, Ho, Er and Gd.

12. The ceramic electronic component of claim 7, wherein the transition metal of the second sub-component is at least one selected from the group consisting of Mo, W, Mn, Fe, Co, Ni, V, Cr, Cu and Zn.

13. The ceramic electronic component of claim 7, wherein each of the dielectric layers has a thickness in a range of 0.2 to 10 μm.

14. The ceramic electronic component of claim 7, wherein the internal electrodes include Ni or a Ni alloy.

15. The ceramic electronic component of claim 7, wherein the internal electrodes are alternately laminated with the dielectric layers.

* * * * *